June 12, 1962 — E. M. DAVIDSON — 3,038,543
AIR BRAKE FOR WIND DRIVEN PROPELLERS
Filed Oct. 3, 1960 — 2 Sheets-Sheet 1
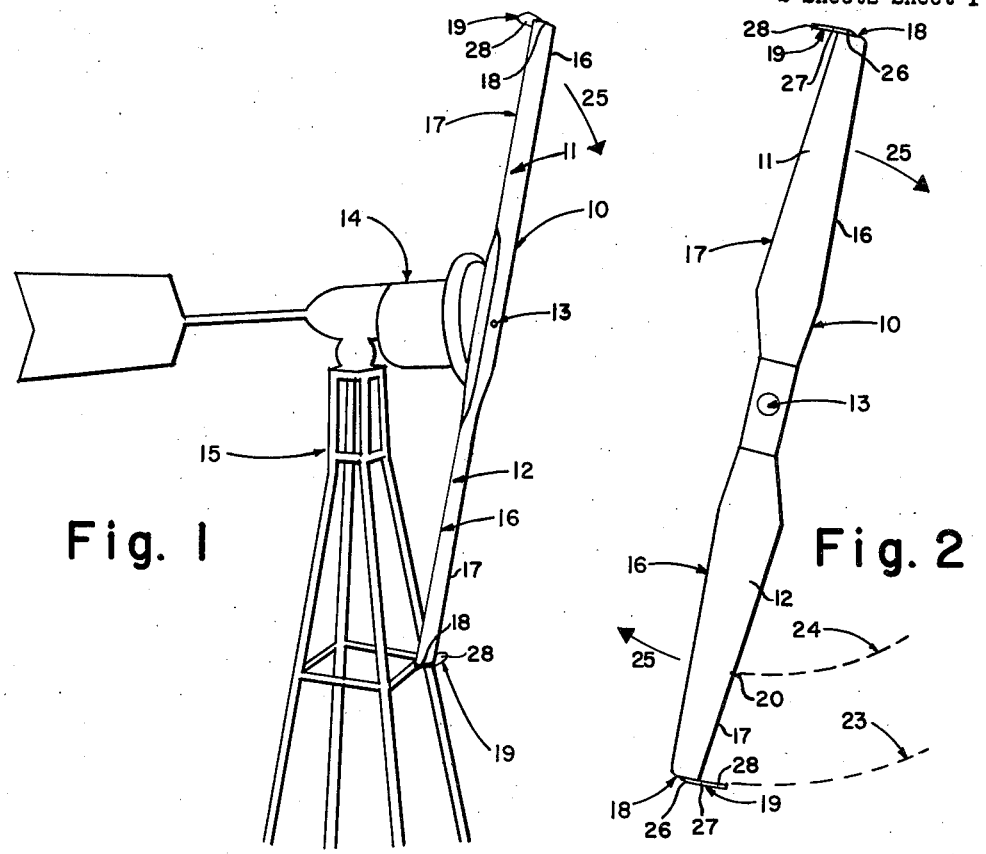
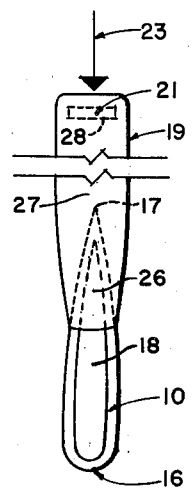
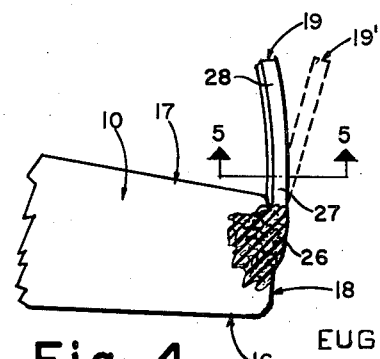
Fig. 1  Fig. 2  Fig. 3  Fig. 4
EUGENE M. DAVIDSON
INVENTOR.
BY Browning, Simms,
Hyer & Eickenroht June 12, 1962  E. M. DAVIDSON  3,038,543
AIR BRAKE FOR WIND DRIVEN PROPELLERS
Filed Oct. 3, 1960  2 Sheets-Sheet 2

EUGENE M. DAVIDSON
*INVENTOR.*

BY Browning, Simms,
Hyer & Eickenroht

United States Patent Office 3,038,543
Patented June 12, 1962

3,038,543
AIR BRAKE FOR WIND DRIVEN PROPELLERS
Eugene M. Davidson, Houston, Tex., assignor to Hudson Engineering Corporation, Houston, Tex., a corporation of Texas
Filed Oct. 3, 1960, Ser. No. 59,923
8 Claims. (Cl. 170—75)

This invention relates to an air brake for wind driven propellers such as used for converting wind power to mechanical or electrical energy. More specifically, the invention relates to an air brake for propellers of the above type which prevents excessive speeds of rotation of the propeller when subjected to high wind velocities or low load conditions.

Wind powered devices are presently used in many isolated localities to produce electrical power where commercial electric power is unavailable. These wind powered devices utilize a wind driven propeller to operate an electrical generator. The mechanical energy of the wind driven propeller is converted to electrical energy for immediate use or for charging storage batteries. Additionally, wind driven propellers find their use in operating other types of devices which adapt the mechanical energy of the wind driven propeller to other forms of energy. An example of this latter type of wind powered device is the windmill providing mechanical energy for operating water pumps.

A common problem is found in all wind powered devices having wind driven propellers. The problem is to prevent the propeller from developing excessive rotative speeds that would be destructive to the wind powered device. The excessive rotative speeds of the propeller are created by high winds, or by low load conditions imposed by the wind powered device upon the propeller. Various devices have been proposed to regulate or govern the rotative speed of such wind driven propellers.

Such devices have had certain objectionable features which prevented wholly satisfactory performance. They generally depend upon the centrifugal force developed by rotation of the propeller or air flow past the blades of the propeller to move a wind deflecting member into a position in which such part can act as an air brake.

These wind deflecting members have been secured directly to the blades of the propeller or to arms extending from the propeller hub. Many mechanical parts are used in the construction of these members and to operably connect such member to the propeller. Such mechanical parts as flaps, hinges, pins, springs, and the like, are subject to wear, corrosion and fatigue and will result in the deterioration and loss of service of such parts and prevents the governing device from operating satisfactorily.

Besides the above poor results that arise through the use of mechanical parts, some means is required to synchronize the action between wind deflecting members when more than one wind deflecting member is used. This requirement naturally results in more mechanical parts being used and increases the weight of the propeller assembly.

Additionally, the devices have exerted their governing action gradually over an extended range of speeds and not at some specific predetermined speed. Such gradual governing action, of course, decreases the efficiency of the propeller.

It is, therefore, an object of the present invention to provide an air brake which is readily attachable to a wind driven propeller of standard design but which has not parts subject to wear, fatigue and corrosion.

Another object is to provide an air brake which does not interfere with the normal operation of the propeller.

A further object is to provide an air brake attachable to a wind driven propeller which does not substantially increase the weight of the propeller or affect the aerodynamic and gyroscopic balance of the propeller.

Another object is to provide an air brake which is immediately responsive to changes in the propeller speed due to gusty winds.

A different object is to provide an air brake attachable to a wind driven propeller which does not reduce the efficiency of the propeller.

A still further object is to provide an air brake in the form of a vane attachable to each blade of a wind driven propeller that requires no mechanical synchronization to coordinate the governing action of each vane.

Yet another object is to provide an air brake having a non-governing position during the normal operating speeds of a propeller until the propeller reaches a predetermined speed of rotation whereupon the air brake is sharply deflected into the air stream.

Another different object is to provide an air brake which after its initial sharp deflection is further deflected into the air stream upon further increases in the speed of rotation above the predetermined speed.

Another object is to provide an air brake attachable to a wind driven propeller in accordance with the preceding objects and which increases the efficiency of the propeller.

These and other objects will become more apparent when read in conjunction with the following detailed description and the attached drawings of a preferred and illustrated embodiment of the invention, wherein:

FIG. 1 is a perspective of a wind driven device embodying a propeller having the air brake vanes of the present invention secured to the propeller tips;

FIG. 2 is an elevation of the propeller and air brake vanes shown in FIG. 1;

FIG. 3 is a plan view of one of the air brake vanes and an end of the propeller shown in FIG. 2;

FIG. 4 is a partial elevation, slightly enlarged, of the air brake vane shown in FIGS. 1 and 2, parts being broken away in section;

Figure 7:
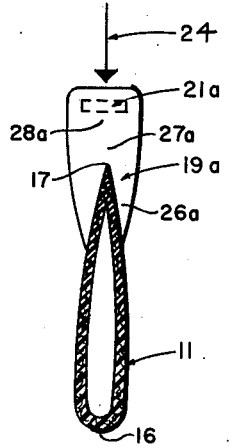
FIG. 7 is a cross-sectional view taken along line 7—7 of FIG. 6 just above an air brake vane.

The objects of the present invention are accomplished by the air brake that is shown in the drawings and fully described hereafter. The air brake is in the form of a vane that is integrally carried by the propeller and such vane does not have the usual mechanical parts heretofore required in the prior governing devices. The vane is so constructed that a wind deflecting part will be extended into the air stream with a "snap action" at a predetermined speed of rotation of the propeller.

The vane is comprised of several portions that provide the unique operating characteristics of the air brake and which permit the air brake to be constructed and operated without the usual mechanical parts.

The vane is constructed so that one portion is adapted to be secured to the propeller, an intermediate resilient portion provides the "snap action" operating characteristics of the air brake and a third portion is normally positioned to intercept the airstream a relatively small amount and, subject to centrifugal action, to flex the intermediate portion and, with a "snap action," to be deflected into a position to intercept the airstream a greater amount.

The vane preferably is secured to the propeller at a point spaced apart from the propeller's axis of rotation and at least in part extends away from its attachment to the propeller in a direction opposite to its direction of rotation of the propeller. The vane should extend generally parallel to the line of travel of that portion of the propeller on which it is carried to produce the most efficient air brake or governing action.

In FIG. 1 there is shown a wind driven device generally indicated by the numeral 14 positioned upon a support 15. A wind driven propeller 10 is rotatably secured to a shaft 13 extending from the device 14.

Referring to FIG. 2, the propeller 10 has blades 11 and 12 and preferably is constructed of a reinforced plastic material such as fiberglass reinforced epoxy resin with a hollow core to reduce its weight. However, propellers constructed of other materials may be used without departing from the invention herein disclosed.

The blades 11 and 12 have leading edges 16 and trailing edges 17 formed in the usual fashion to provide the desired aerodynamic characteristics of the propeller. The ends or tips of the blades are designated by the numeral 18.

The propeller shown in FIG. 2 is arranged to rotate in a clockwise direction indicated by the arrows 25 when subjected to a wind having a direction normal to the drawing. An arbitrary point 20 on either blade would describe an arc 24 upon rotation of the propeller. The tip 18 will describe an arc 23 upon rotation of the propeller. These arcs are circular when viewed along the rotative axis of the propeller as can be seen in FIG. 2. However, the arcs 23 and 24 are helical with respect to the wind passing through the propeller.

The term "line of travel" is herein used to denote arcs such as 23 and 24.

In the embodiment shown in FIGS. 1 through 5 a wind driven propeller 10 is provided with an air brake by securing a vane 19 on each of its tips 18.

A single vane 19 may be used on only one tip 18 but it is preferable to use a vane on each of the propeller tips to avoid unbalancing the propeller. Naturally, vanes of an equal weight should be spaced equidistant from the rotative axis of the propeller to preserve the balance of the propeller to which they are secured.

The vanes may be constructed of any material which is not subject to corrosion, fatigue and wear and that will permit the vane to perform its function properly.

We have found that a resilient thermosetting plastic material, such as an epoxy resin, is well suited as a material to construct these vanes. The vanes of this material may be operated many times in controlling the speed of a wind driven propeller to which they are attached without any sign of corrosion, fatigue and wear.

Vanes may be formed integrally with the propeller where both are manufactured by molding from the same plastic material, with or without a reinforcing agent such as fiberglass.

The vane and propeller may be joined by simply securing them together if produced separately. This is accomplished most conveniently by applying a bonding agent or adhesive to the complementary surfaces of the vane and propeller to be joined and then pressing them together and maintaining pressure for the time required for these surfaces to be joined and thereby bonding or gluing the vane to the propeller.

In the instance where the vane and propeller are formed of a thermosetting plastic material, the vane may be secured to the propeller by adhesive bonding and/or mechanical attachment.

The vane 19 may be secured to propeller tip 18 by means other than by bonding or gluing but preferably without a flexing joint between the vane and propeller.

As can be most clearly seen in FIGS. 3 and 4, the vane 19 is positioned at the tip of the propeller and in part extends beyond the trailing edge 17 and along arc 23 described by rotation of tip 18. The vane at least in part extends from its attachment to the propeller in a direction opposite to the direction of rotation of the propeller and generally parallel to the line of travel. The vane 19 may be curved to coincide with arc 23 in order to provide a shape having a minimum effect on the air flow characteristics of the propeller when in its undeflected position. However, such curvature exactly along arc 23 is not essential to satisfactory operation of the air brake.

The vane 19 is comprised of three functional portions which are however integrated in structure.

The first or anchoring portion 26 is integrally and rigidly secured to the propeller and therefore is provided with a surface complementary to that part of the propeller to which it is attached. When these surfaces are integrally joined there is no interruption in the air foil of the propeller and vane to reduce the propeller's efficiency. As can be seen, the exterior surface of the first portion 26 of the vane 19 is rounded and curved to blend in to the surface of the propeller.

The intermediate or controlled hinge portion 27, which is close to but slightly spaced in a trailing direction from the rearmost extremity of the attachment of the vane to the propeller blade, provides the "snap action" operating characteristic of the air brake and is composed of a material that may be repeatedly flexed without deterioration. A material of such resiliency as fiberglass reinforced epoxy resin is desirable.

Figure 5:
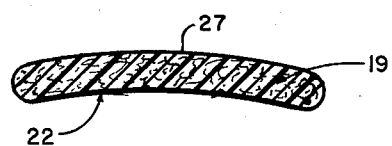
FIG. 5 is an enlarged sectional view taken substantially along the line 5—5 of FIG. 4.

As shown in FIG. 5, this intermediate portion 27 is arcuate in a section taken transverse to the line of travel of the propeller and has its concave surface 22 exposed toward the rotative axis of the propeller.

This intermediate arcuate portion may have a single concave section such as shown in FIG. 5 or it may be desirable to provide a plurality of such curved sections. Also, it may be desirable to provide an undulated cross section comprised of both concave and convex surfaces. Increasing the number of curved surfaces will increase the force required to flex their intermediate portion.

The third or braking portion 28, which provides the actual braking interference with the air, extends away from the intermediate arcuate part and may be provided with a weight 21 imbedded therein to increase its mass. This third portion 28 provides a mass subject to centrifugal forces due to the rotation of the propeller and is deflected into the airstream upon the propeller reaching a predetermined speed to control the speed thereof. It has been found that the third portion should be of an elongated rigid flat shape to secure the maximum governing action when it is deflected into the airstream.

The airbrake operates in the following manner. While the propeller 10 rotates at any speed below a predetermined speed the vane 19 and particularly the braking portion 28 thereof remains in its undeflected position as shown in solid lines in FIG. 4 and thus does not interfere with the operation and efficiency of the propeller.

Upon the propeller reaching a predetermined speed the centrifugal forces deflect the third portion 28 of the vane 19 into the airstream with a "snap action" to a position 19' as shown in phantom in FIG. 4 by flexing the intermediate arcuate portion 27. In the position 19' the portion 28 of the vane 19 extends transversely of the air flow and disrupts the airstream about the propeller and effectively controls its speed.

The "snap action" operating characteristic of this air brake is due to the arcuate transverse section of the intermediate portion 27 of vane 19 as shown in FIG 5. Before the intermediate portion 27 can be flexed by the third portion 28 of vane 19, sufficient force must be exerted on the intermediate portion 27 to overcome its tendency to remain curved in transverse section. When sufficient force is applied, the arcuate part 27 is flattened and thereby becomes flexible.

The flattening of the arcuate part 27 is not gradual and proportional to the force applied but occurs nearly instantaneously upon the application of sufficient force to effect such flattening. This instantaneous flattening results in the "snap action" operating characteristics of the present invention. The force applied by the third portion 28 to effect such flattening of the intermediate portion 27 is the centrifugal force created by rotation of the propeller in such third portion.

It is this "snap action" operating characteristic which provides instant application of speed control to the propeller at a predetermined speed of rotation and not the gradual application of such controlling action found in the prior art devices.

Once the intermediate arcuate portion 27 is flexed, further increases in the speed of rotation will further flex this intermediate portion 27 and permit the third portion 28 to be further extended into the airstream.

When the speed of the propeller is reduced to a predetermined speed of rotation, the centrifugal forces are insufficient to flatten the transverse section of the intermediate arcuate part 28 and the third portion 28 of the vane 19 returns to its normal undeflected position with a "snap action."

Figure 6:
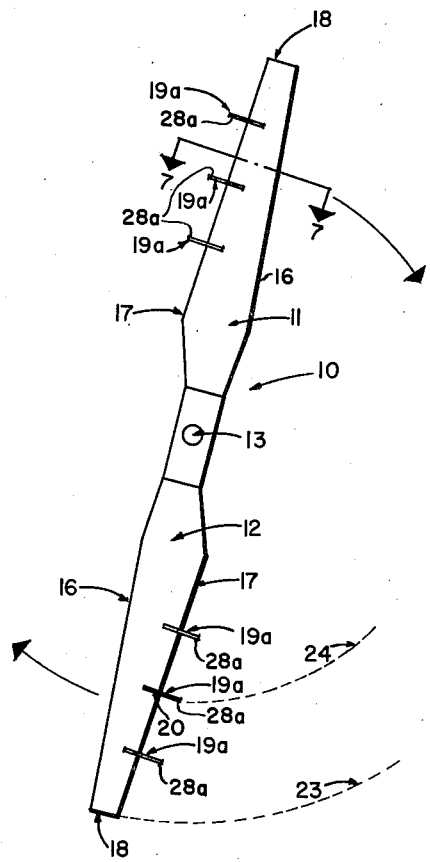
FIG. 6 is a front elevation of a second embodiment of the present invention showing air brake vanes secured to the trailing edge of the propeller intermediate its ends.

A second embodiment is shown in FIGS. 6 and 7 wherein the vanes 19a are mounted on the propeller 10 at points other than on the tips 18.

The vanes 19a are substantially identical in structure and operation to the vanes 19 and may be provided with a weight 21a to increase the mass of the third portion 28a so that the intermediate portion 27a will flex at the desired speed of rotation. However, it is found preferable to provide a notch in the first portion 26a that permits the vane 19a to embrace and be secured by any convenient means about the trailing edge 17 of the propeller.

It may be desirable to use more than one pair of vanes 19a, as shown in FIG. 6, to obtain increased governing action.

The efficiency of a wind driven propeller is usually decreased by the flowing of air from one side of the propeller across the propeller's tips to the other side. A tip seal may be used to prevent such flowing of air across the tip of the propeller and thereby increase the propeller's efficiency.

The embodiment of the vane 19 shown in FIGS. 3 and 4 will increase the efficiency of the propeller since the first portion 26 used in securing vane 19 to tip 18 extends laterally beyond the faces of the blade and will serve as a partial tip seal. In order to reduce the flowing of air across the tip 18 to an even greater degree and thereby securing greater efficiency of the propeller, the embodiment of a vane of the present invention shown in FIG. 8 may be used.

Figure 8:
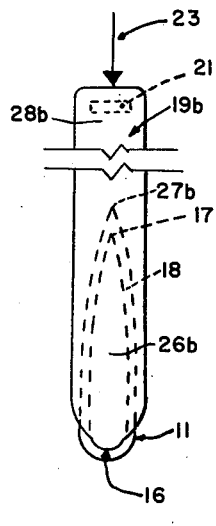
FIG. 8 is a plan view of another embodiment of the present invention showing one air brake vane and an end of the propeller.

The vane 19b shown in FIG. 8 is substantially identical with the vane shown in FIGS. 3 and 4 except that it is secured to tip 18 with its first portion 26b closely adjacent the leading edge 16 of propeller 10. The vane 19b shown in FIG. 8 extends substantially along tip 18 from the leading edge 16 to the trailing edge 17 and to a short distance beyond one or both sides of the propeller and, as previously described, its intermediate part 27b and third part 28b extend away from its attachment to the propeller in a direction opposite to the direction of rotation of the propeller. The vane needs to extend beyond one or both sides of the propeller, especially on the upstream or windward side, to a distance where the flowing of air across the tip 18 is reduced and the desired increase in efficiency of the propeller is obtained. Thus, the vane 19b may serve as a highly effective tip seal to increase the efficiency of the propeller in addition to functioning in the manner heretofore set forth to accomplish all the objects of an air brake.

The vanes heretofore described may be produced with substantial identical characteristics so that their action is synchronized without the use of mechanical linkages.

Where a plurality of vanes are used they may be produced with such operating characteristics to that all operate at the same predetermined speed of rotation to provide a magnified governing effect or at different predetermined speeds to provide a stepwise governing effect.

It has been found that gusty winds have no adverse effect upon the operation of the air brakes of the present invention since the vanes respond only to the variable that is to be controlled—i.e., the rotative speed of the propeller.

It will be readily appreciated from the foregoing description that there is herein provided a novel, inexpensive and easily attachable air brake vane that provides for a "snap action" deflection into a position in the airstream to govern the speed of a propeller at a predetermined speed of rotation. In addition, there is also disclosed a vane that has no mechanical parts subject to corrosion nor that requires additional elements to enable it to function properly.

The invention may be embodied in other forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of the equivalency of the claims are therefore intended to be embraced therein.

The invention having been described, what is claimed is:

1. In combination with a wind driven propeller, an air brake comprising a vane integrally carried by the propeller, said vane being spaced from the axis of rotation on the propeller and extending away from said propeller in a direction opposite to the direction of rotation of the propeller and generally parallel to the line of travel of the portion of said propeller on which it is carried, said vane having one anchor portion integrally secured to the propeller, an intermediate resilient hinge portion arcuate in a section taken transverse to the line of travel of the propeller with its concave surface exposed toward the rotative axis of the propeller, and a third braking portion extending away from said intermediate part and subject to centrifugal action upon rotation of the propeller to flex the arcuate portion of the vane and to be deflected with a snap action into the airstream at a predetermined speed of rotation.

2. The combination of claim 1 wherein said third portion has an elongated rigid flat part subject to centrifugal action upon rotation of the propeller to further flex the arcuate part upon each increase in the speed of rotation above the predetermined speed of rotation of the propeller at which the snap action occurs and thereby be further deflected gradually into the airstream as the speed increases.

3. In combination with a wind driven propeller, an air brake comprising a vane integrally carried on the trailing edge of said propeller, said vane being spaced from the axis of rotation on the propeller and extending away from the trailing edge in a direction opposite to the direction of rotation of the propeller and generally parallel to the line of travel of the portion of said propeller on which it is carried, said vane having a first anchor portion integrally secured to the trailing edge of said propeller, an intermediate resilient hinge portion arcuate in a section taken transverse to the line of travel of the propeller and having its concave surface exposed toward the rotative axis of the propeller, and a third braking portion of the vane extending away from said intermediate portion and subject to centrifugal action upon rotation of the propeller to flex the intermediate arcuate hinge portion and to be deflected into the air stream at a predetermined speed of rotation of the propeller.

4. The combination of claim 3 wherein said third braking portion has an elongated rigid flat part subject to centrifugal action upon rotation of the propeller to further flex the arcuate hinge portion upon increase in the speed of rotation of the propeller above the predetermined speed of rotation of the propeller and thereby be further deflected into the air stream.

5. In combination with a wind driven propeller, an air brake comprising a vane integrally carried at the tip of the propeller and extending away from the propeller in a direction opposite to the direction of rotation of the propeller and generally parallel to the arc described by rotation of the propeller tip, said vane having a first anchor portion integrally secured to the tip of said propeller, an intermediate resilient hinge portion arcuate in a section taken transverse to the line of travel of the propeller and having its concave surface exposed toward the rotative axis of the propeller, and a third braking portion extending away from said intermediate portion and subject to centrifugal action upon rotation of the propeller to flex the intermediate arcuate portion and to be deflected into the airstream at a predetermined speed of rotation of the propeller.

6. The combination of claim 5 wherein the third anchor portion has an elongated rigid flat part subject to centrifugal action upon rotation of the propeller to further flex the arcuate hinge portion upon increase in the speed above the predetermined speed of rotation of the propeller and thereby to be further deflected into the airstream.

7. In combination with a wind driven propeller, an air brake comprising a vane integrally carried at the tip of the propeller, said vane extending along the tip of the propeller and to a distance beyond one side of the propeller, the vane extending away from the propeller in a direction opposite to the direction of rotation of the propeller and generally parallel to the arc described by rotation of the propeller tip, said vane having a first anchor portion secured to the tip of said propeller, an intermediate resilient hinge portion arcuate in a section taken transverse to the line of travel of the propeller and having its concave surface exposed toward the rotative axis of the propeller, and a third braking portion extending away from said intermediate portion and subject to centrifugal action upon rotation of the propeller to flex the intermediate arcuate portion and to be deflected into the airstream at a predetermined speed of rotation of the propeller.

8. The combination of claim 7 wherein the third braking portion has an elongated rigid flat part subject to centrifugal action upon rotation of the propeller to further flex the arcuate portion upon increase in the speed above the predetermined speed of rotation of the propeller and thereby to be further deflected into the airstream.

References Cited in the file of this patent

UNITED STATES PATENTS

| | | |
|---|---|---|
| 1,537,401 | Blumschein | May 12, 1925 |
| 2,437,659 | Albers | Mar. 9, 1948 |

FOREIGN PATENTS

| | | |
|---|---|---|
| 830,627 | Germany | Feb. 7, 1952 |